United States Patent [19]

Matsuzaki

[11] Patent Number: 5,068,759
[45] Date of Patent: Nov. 26, 1991

[54] THIN FILM MAGNETIC HEAD OF SMALL SIZE CAPABLE OF CERTAINLY AND STABLY CONNECTING LEAD WIRES

[75] Inventor: Mikio Matsuzaki, Koshigaya, Japan

[73] Assignee: TDK Corporation, Tokyo, Japan

[21] Appl. No.: 501,041

[22] Filed: Mar. 29, 1990

[30] Foreign Application Priority Data

Mar. 30, 1989 [JP] Japan .................................. 1-79457

[51] Int. Cl.⁵ .............................................. G11B 5/60
[52] U.S. Cl. ................................................. 360/103
[58] Field of Search .......................... 360/103; 29/603

[56] References Cited

U.S. PATENT DOCUMENTS 4,789,914 12/1988 Ainslie et al. ...................... 360/103

FOREIGN PATENT DOCUMENTS 57-98120 6/1982 Japan .................................. 360/103

*Primary Examiner*—Robert S. Tupper
*Attorney, Agent, or Firm*—Oblon, Spivak, McClelland, Maier & Neustadt

[57] ABSTRACT

A thin film magnetic head comprises a slider having an air bearing surface, a reading/writing element formed in an end surface of the slider and bonding pads formed in a side surface different from the end surface in which the reading/writing element is formed.

6 Claims, 6 Drawing Sheets

THIN FILM MAGNETIC HEAD OF SMALL SIZE CAPABLE OF CERTAINLY AND STABLY CONNECTING LEAD WIRES

BACKGROUND OF THE INVENTION

1. Field of the Invention

The present invention relates to a flying type thin film magnetic head having a reading/writing element at an end surface of a slider having an air bearing surface.

2. Discussion of Background

There has been known a thin film magnetic head which floats with a space by a minute air bearing to a magnetic recording medium by utilizing a dynamic pressure resulted when the magnetic recording medium is moved. Such flying type magnetic head is disclosed in, for instance, Japanese Patent Publication Nos. 21329/1983 and 650/1983 or U.S. Pat. 3,823,416. As the basic construction disclosed in U.S. Pat. Nos. 4,130,847, 4,218,715 and 4,210,853, reading/writing elements are formed in the end portion at the side of air flow of a slider having an air bearing surface which faces the magnetic recording medium.

FIG. 7 is a perspective view of a conventional thin film magnetic head as disclosed in U.S. Pat. Nos. 4,219,854, 4,219,855 and 4,190,872, wherein a reference numeral 1 designates a slider composed of, for instance, a ceramic assembly and numerals 2A, 2B designate reading/writing elements. The slider 1 is provided with a pair of rail portions 101, 102 with a space therebetween at a surface facing a magnetic recording medium wherein the surfaces of the rail portions are finished as air bearing surfaces 103, 104 having high flatness. The air bearing surfaces 103, 104 are respectively provided with taper portions 103a, 104a at their one end portions which constitute air flowing ends with respect to an air flow which flows in the direction of an arrow mark a, in association with the magnetic recording medium. The reading/writing elements 2A, 2B are respectively thin film magnetic head elements prepared in accordance with the same process as an IC manufacturing technology, and the reading/writing elements are respectively formed at the air discharging end portion which opposes the taper portions 103a, 104a.

A numeral 3 designates a protective film of alumina or the like which covers the reading/writing elements 2A, 2B. Numerals 41A, 42A are bonding pads for the reading/writing element 2A, and numerals 41B, 42B designate bonding pads for the reading/writing element 2B. The bonding pads are formed on the protective film 3 at the same end surface as the end surface where the reading/writing elements 2A, 2B are formed. The bonding pads 41A, 42A, 41B, 42B are electrically connected to conductor coils for the reading/writing elements, and lead wires for a magnetic disk apparatus (not shown) are connected to the bonding pads.

In the thin film magnetic head of this kind, there is the trend of miniaturization in order to comply with a demand of high density and high speed magnetic recording. The miniaturization of the thin film magnetic head is effective to reduce a flying height necessary for the high density recording and to reduce a spacing loss. Further, it is advantageous to increase the resonance frequency in association with a gimbal spring, to eliminate crushing and to improve durability. Further, an appropriate balance is obtainable between the dynamic pressure and the pressure of a supporting spring and the posture of the magnetic head can be properly maintained, whereby stable flying characteristics can be obtained. Further, reduction in the mass of the magnetic head obtained by the miniaturization increases the accessing movement of an arm which supports a gimbal structure.

In the conventional flying type thin film magnetic head, however, since the bonding pads 41A, 42A, 41B, 42B were formed in the end surface in which the reading/writing elements were also formed, there was a restriction by a space where the bonding pads 41A, 42A, 41B, 42B, were to be installed.

SUMMARY OF THE INVENTION

It is an object of the present invention to provide a flying type thin film magnetic head of a small size which is capable of connecting certainly and stably lead wires connected to a magnetic disk apparatus, and capable of being easily manufactured.

The foregoing and other objects of the present invention have been attained by providing a thin film magnetic head which comprises a slider having an air bearing surface, a reading/writing element formed in an end surface of the slider and bonding pads formed in a side surface different from the end surface in which the reading/writing element is formed.

In the present invention, since the bonding pads for the reading/writing element are formed in a side surface different from an end surface having the reading/writing element of a slider, the surface area of the end surface having the reading/writing element can be reduced without suffering substantially a restriction by the surface area for the bonding pads, whereby the thin film magnetic head can be miniaturized as a whole.

Further, the side surface in which the bonding pads are formed is obtained when the thin film magnetic head itself is cut from a wafer in the manufacturing of the head. Accordingly, it is possible to expose the bonding pads on the side surface as soon as the cutting operation has finished. Therefore, it is easy to manufacture the magnetic head.

In addition, since the grooves are formed in the side surface of the slider so as to extend through the bonding pads, lead wires can be fitted to the grooves to be connected to the bonding pads. Accordingly, the lead wires can be certainly and stably connected to the bonding pads.

BRIEF DESCRIPTON OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
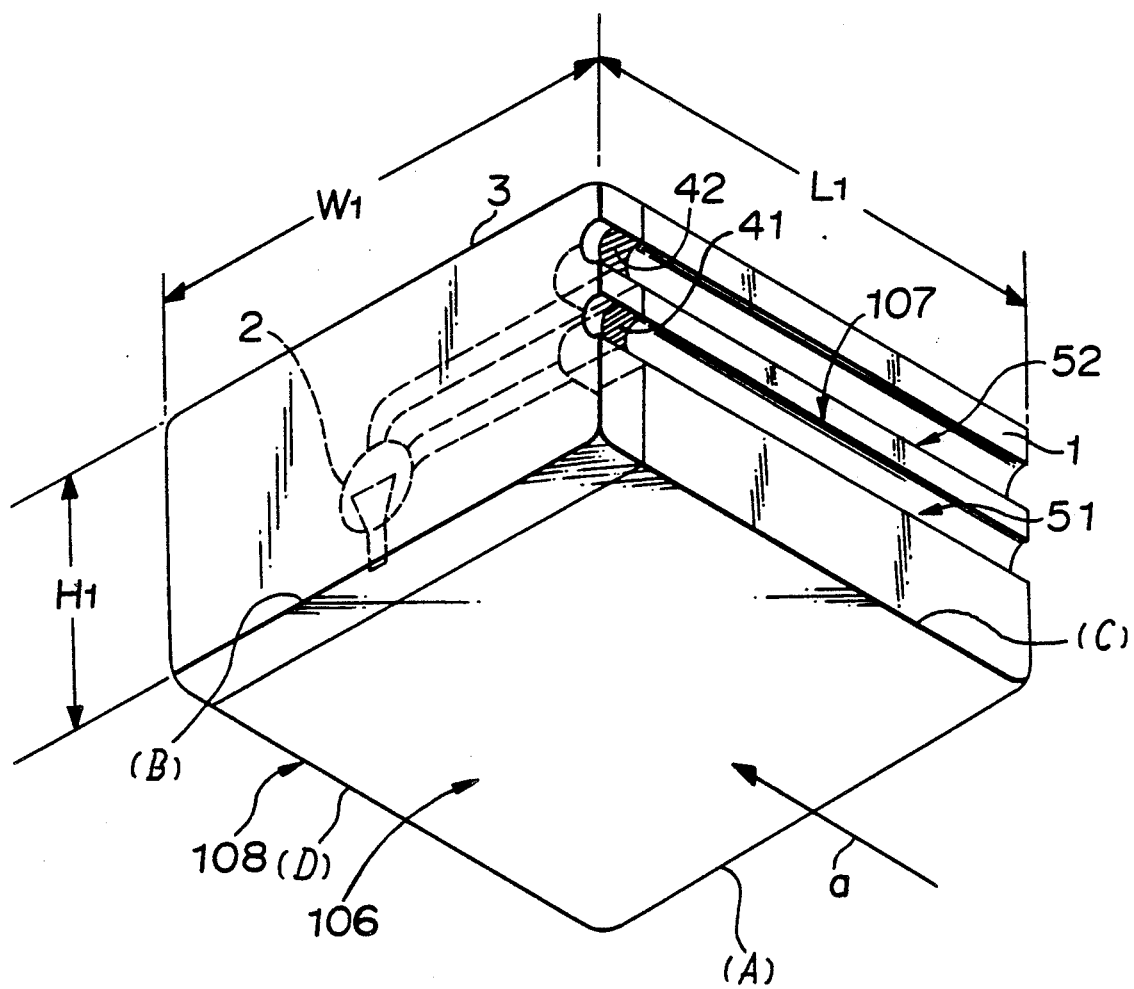
FIG. 1 is a perspective view of an embodiment of the thin film magnetic head according to the present invention.

Referring to the drawings, wherein the same reference numerals designate the same or corresponding parts throughout the several views, and more particularly to FIG. 1 thereof, there is shown in perspective view an embodiment of the thin film magnetic head according to the present invention. In this embodiment, an air bearing surface 106 formed in a slider 1 so as to oppose a magnetic recording medium is made flat without having rail portions and taper portions to produce a lifting force. It is preferable that edges A, B formed at the air bearing surface, when they are viewed with respect to the direction of flowing air a, are respectively in a form of an arc so that the dragging of the slider 1 to the surface of a magnetic disk at the time of contact-start can be eliminated. Other edges C, D may be in a form of an arc.

A reading/writing element 2 is formed in an end surface which is located at the side of air-discharging with respect to an air flow flowing in the direction of an arrow mark a, the air flow being produced in association with the magnetic recording medium. In this embodiment, a single reading/writing element 2 is used, and the element is arranged at an intermediate portion in the direction of width of the slider.

Bonding pads 41, 42 for the reading/writing element 2 are formed in a side surface .107 of the slider 1. Further, grooves 51, 52 in a form of stripe are formed in the side surface 107 of the slider 1 in its entire length so as to extend through the bonding pads 41, 42. The grooves 51, 52 are respectively formed to have a shape corresponding to the shape of lead wires connected to the bonding pads. In this embodiment, the grooves having a semi-circular shape in cross section are formed on the assumption that the lead wire having a semi-circular shape in cross section are used.

Figure 2:
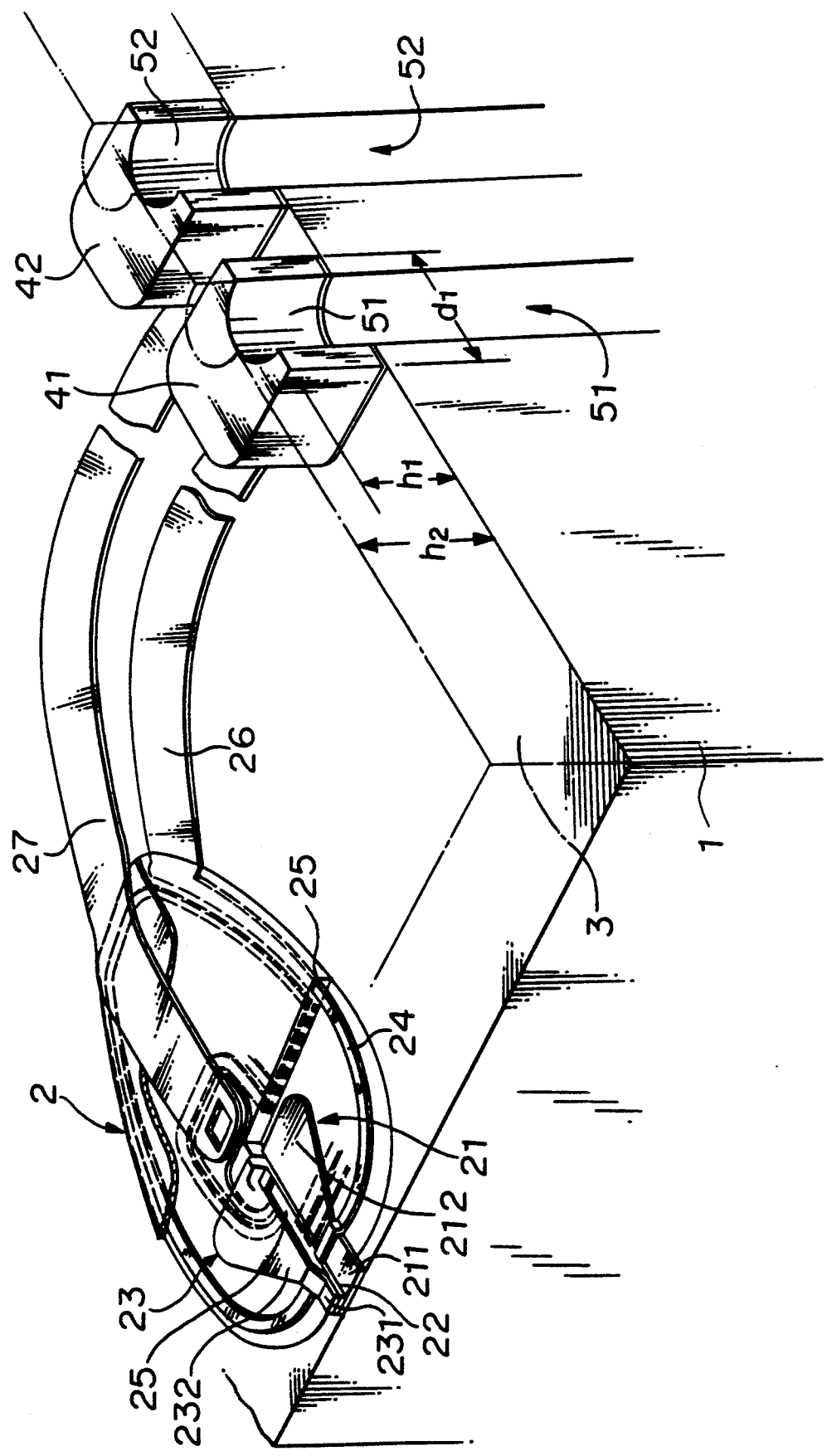
FIG. 2 is a perspective view partly broken of an embodiment of the construction of a reading/writing element connected to bonding pads.
Figure 3:
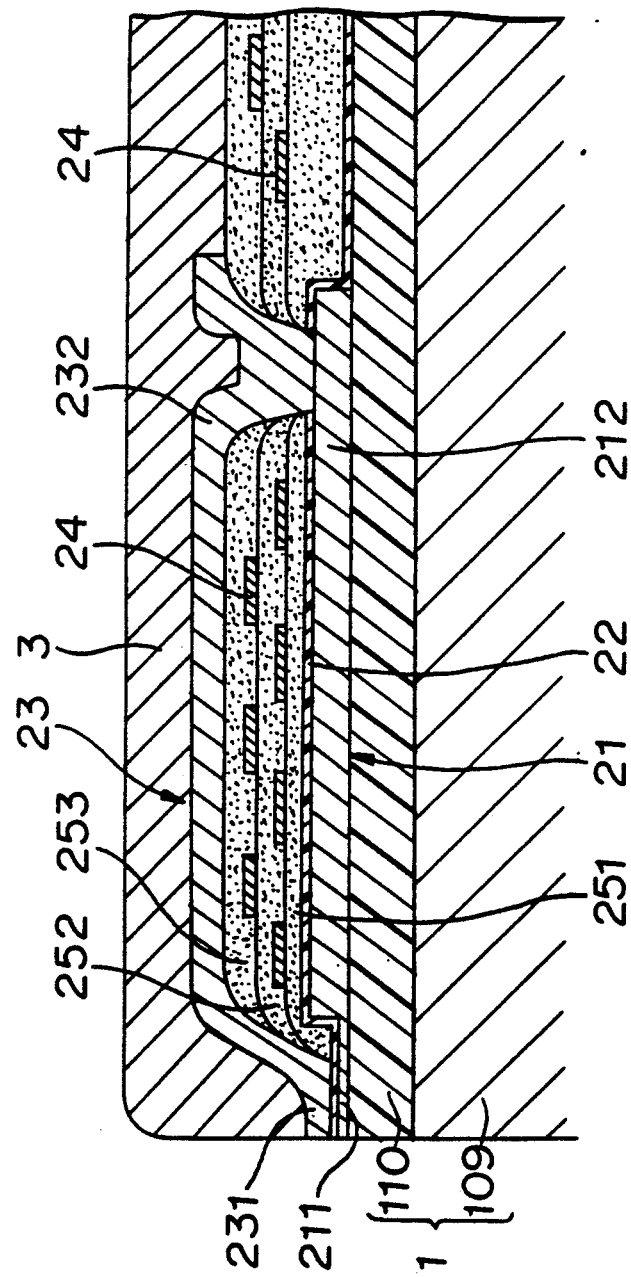
FIG. 3 is an enlarged cross-sectional view partly broken of the reading/writing element.

FIG. 2 is a perspective view showing the construction of the reading/writing element 2 and the bonding pads 41, 42 and FIG. 3 is an enlarged cross-sectional view of the reading/writing element 2. In FIGS. 2 and 3, a reference numeral 21 designates a lower magnetic film, a numeral 22 designates a gap film made of a material such as alumina, a numeral 23 designates an upper magnetic film, a numeral 24 designates conductor coil films, a numeral 25 designates an insulating film made of an organic resinous material such as novolak resin, and numerals 26, 27 designate lead electrodes.

As shown in FIG. 3, the slider 1 comprises a substrate 109 of $Al_2O_3.TiC$ on which an insulating film 110 of a material such as alumina or the like is coated, and the reading/writing element 2 is formed on the insulating film 110.

Each end portion of the lower and upper magnetic films 21, 23 constitute a pole section 211, 231 which opposes each other within the gap film 22 having a small thickness. The pole sections 211, 231 perform reading and writing function. Numerals 212, 232 designate yoke portions which connect the lower magnetic film 21 with the upper magnetic film 23 at the end portions opposite the pole sections 211, 231.

The insulating film 25 is composed of a plurality of insulating layers 251-253. The conductor coil films 24 are respectively formed on the insulating layers 251, 252 in a spiral form so as to surround the connecting portion of the yoke portions 212, 232.

The lead electrodes 26, 27 have their one ends connected to both ends of the conductor coil films 24 and other ends connected to the bonding pads 41, 42.

The bonding pads 41, 42 are exposed at an end of the side surface 107 of the slider 1. The bonding pads 41, 42 are formed as plated films so that the surface area exposed at the side surface 107 has a sufficient surface area necessary to connect the lead wires. Specifically, the surface area has a width $d_1$ of about 100–250 $\mu$m and a height $h_1$ of about 50 $\mu$m.

Figure 7:
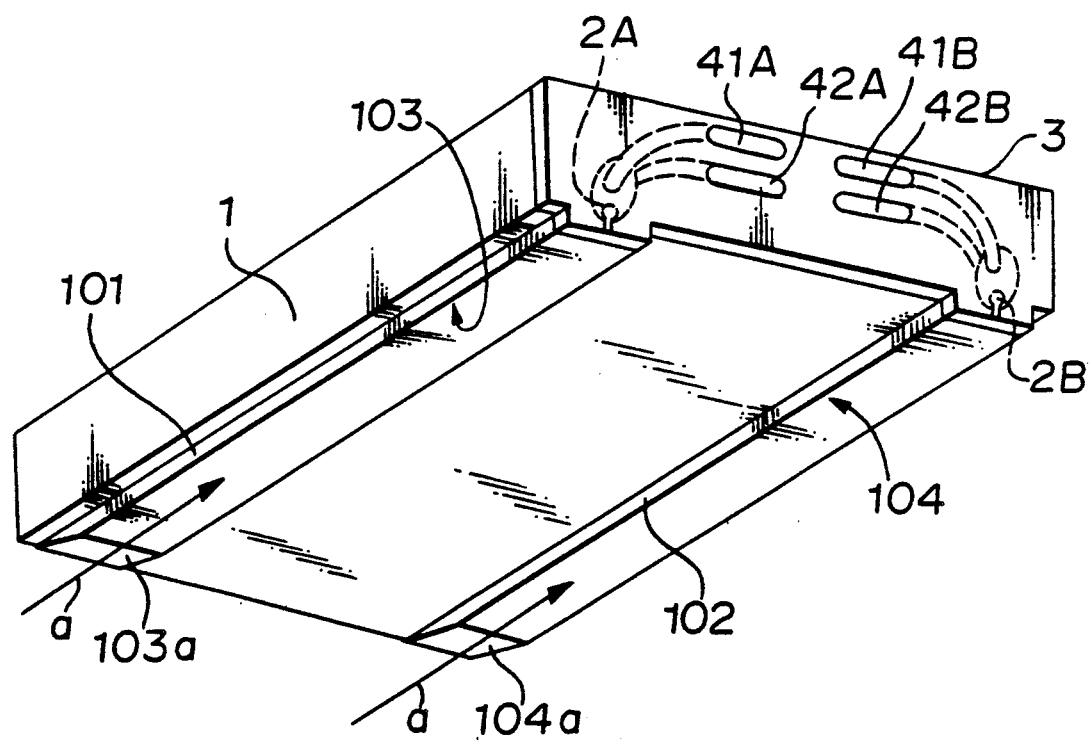
FIG. 7 is a perspective view of a conventional thin film magnetic head.

The bonding pads 41, 42 are covered by a protective film 3. In the conventional magnetic head as shown in FIG. 7, it was necessary to polish the surface of the protective film 3 to thereby expose the electrode surfaces of the bonding pads so as to bond the lead wires. In the present invention, however, such polishing work is unnecessary to thereby simplified manufacturing steps. The grooves 51, 52 are formed in the side surface of the slider as well as the bonding pads 41, 42 so as to pass through the bonding pads in the central portions in the width direction of the bonding pads.

Figure 4:
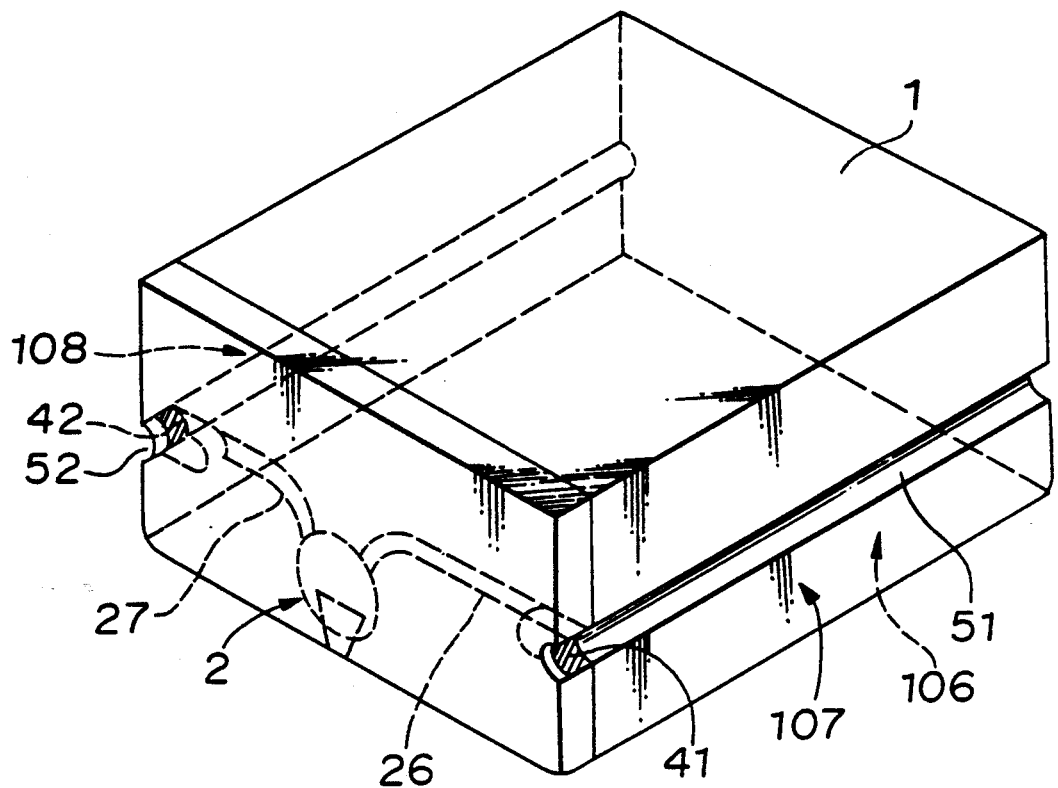
FIG. 4 is a perspective view of another embodiment of the thin film magnetic head of the present invention.

FIG. 4 is a perspective view showing another embodiment of the thin film magnetic head of the present invention. In this embodiment, the direction of connection of the bonding pads 41, 42 are opposite to each other wherein the bonding pad 41 is formed at an end portion of a side surface 107 and the bonding pad 42 is formed at an end of the other side surface 108 which opposes the side surface 107, and each of the grooves 51, 52 is formed in each of the side surfaces 107, 108 so as to extend through each of the bonding pads 41, 42.

Thus, in the thin film magnetic head of the present invention, the bonding pad 41 or 42 for the reading/writing element 2 is formed in the side surface 107 or 108 of the slider 1. Accordingly, the width $W_1$ of an end surface where the reading/writing element 2 is formed can be reduced to thereby reduce the surface area of the end surface, whereby the entire size of the thin film magnetic head can be reduced unlike the conventional technique wherein the bonding pads 41, 42 are formed in the same end surface where the reading/writing element 2 is formed. Specifically, the size of the slider 1 can be reduced in such a manner that the thickness $H_1$ from the air bearing surface 106 to the opposing upper surface is 0.65 mm or less, the length $L_1$ in the direction of air flow is in a range of 0.5 mm–2 mm and the width $W_1$ in the direction perpendicular to the direction of air flow is in a range of about 0.5 mm–2 mm.

Further, in the small-sized slider of the present invention, grooves 51, 52 are formed, whereby the lead wires to be connected to the magnetic disk apparatus can be fitted to the grooves 51, 52 and they can be certainly and stably connected to the bonding pads.

Further, since a cut surface of a wafer when the wafer is cut to obtain separate thin film magnetic heads in manufacturing steps constitutes the side surface 107 or 108 in which the bonding pad or pads 41, 42 are formed, the bonding pads 41, 42 can be exposed at the side surface 107 or 108 as soon as the cutting operation has finished.

More detailed description will be described with respect to this with reference to FIGS. 5 and 6 which are disclosed in U.S. Pat. No. 4,624,048.

Figure 5:
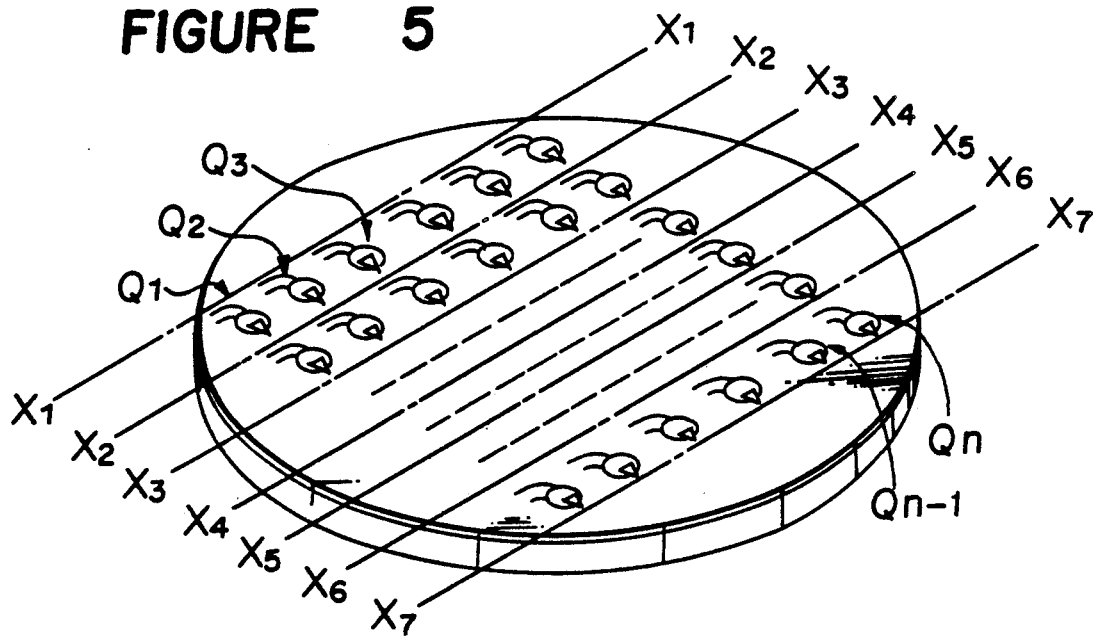
FIGS. 5 and 6 are diagrams showing an example of manufacturing processes for a thin film magnetic heads according to present invention.
Figure 6:
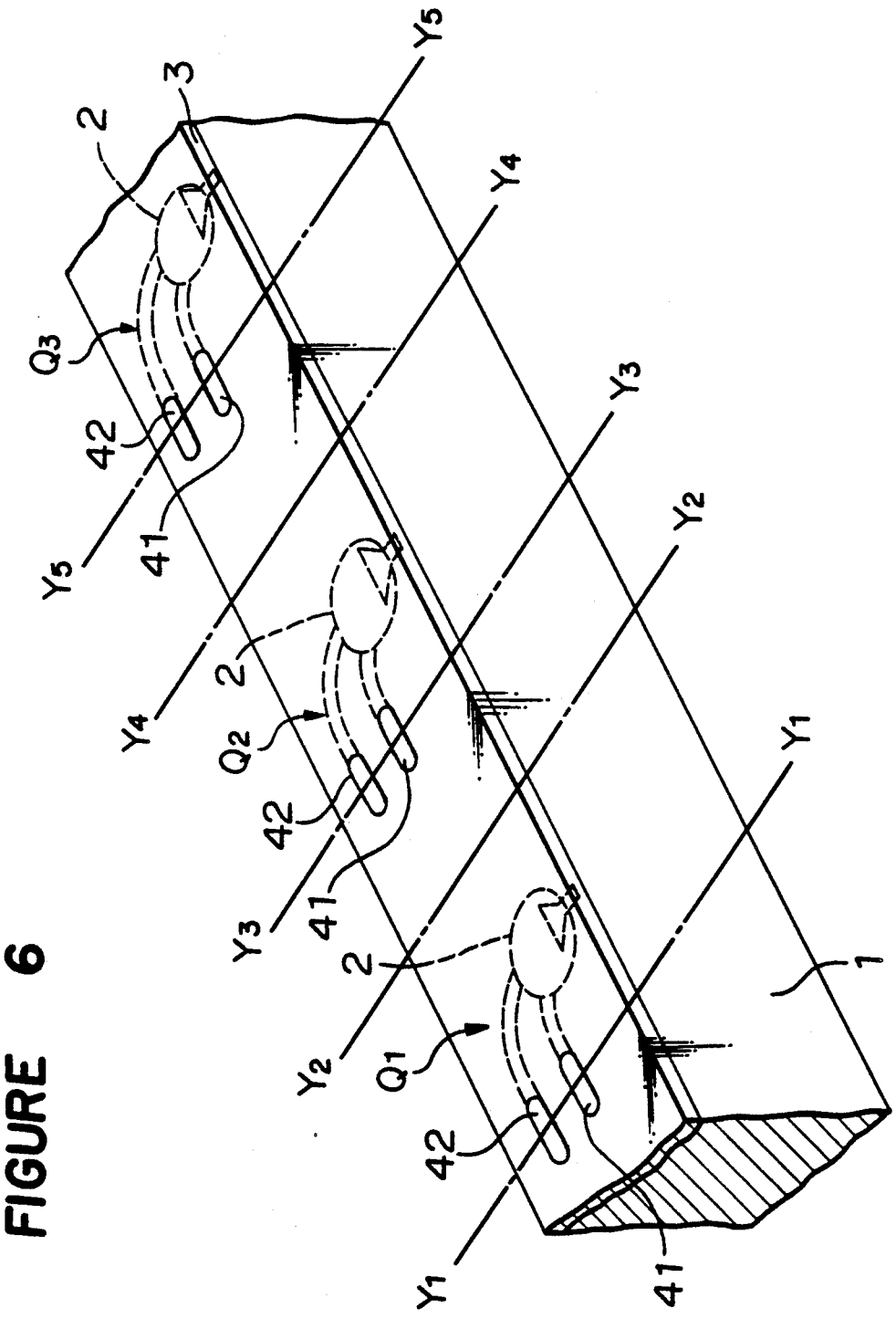

As shown in FIG. 5, thin film magnetic head elements $Q_1$–$Q_n$ are formed in alignment with each other on a wafer 1, which is to be cut to produce sliders, in accordance with the ordinary manufacturing steps.

In order to obtain thin film magnetic heads $Q_1-Q_n$ from the wafer 1, the wafer 1 is cut along cutting lines $(X_1-X_1)-(X_7-X_7)$ to separate blocks including several thin film magnetic head elements. Then, each of the blocks is cut along cutting lines $(Y_1-Y_1)$, $(Y_3-Y_3)$ and $(Y_5-Y_5)$ which pass the each pair of the bonding pads 41, 42 of each of the thin film magnetic head elements $Q_1$, $Q_2$, $Q_3$, and along cutting lines $(Y_2-Y_2)$, $(Y_4-Y_4)$ between the thin film magnetic head elements $Q_1$ and $Q_2$ and between $Q_2-Q_3$, whereby each end surface of the bonding pads 41, 42 is exposed at the cut surface cut along the lines $(Y_1-Y_1)$, $(Y_3-Y_3)$ and $(Y_5-Y_5)$ as shown in FIG. 6. After the cutting operations, the grooves are respectively formed in each of the thin film magnetic head elements, whereby the thin film magnetic head having the shape as shown in FIG. 1 can be obtained. Thus, in accordance with the present invention, the manufacture of the thin film magnetic head can be easy because the bonding pads 41, 42 can be exposed in the side surface 107 or 108 as soon as the cutting operation has finished.

In a case that the thin film magnetic head as shown in FIG. 4 is to be prepared, the bonding pads of each of the thin film magnetic head elements $Q_1-Q_n$ formed on the wafer 1 in an aligning form (FIG. 5) are formed so as to be opposite to each other; the wafer 1 is cut along the lines as described above so as to pass through the bonding pads, and grooves are formed in the cut surface of each of the elements.

In the above-mentioned embodiment, the thin film magnetic head of a in-plane recording and reproducing type is described. However, the present invention is applicable to a thin film magnetic head of a vertical magnetic recording and reproducing type. Further, the present invention is applicable to a thin film magnetic head (as shown in Figure 7) having rail portions at an air bearing surface and taper portions for producing a floating force and having two reading/writing elements by making the direction of one lead electrode and one bonding pad opposite to the other lead electrode and other bonding pad. Further, the present invention is applicable to a three terminal type thin film magnetic head having a center tap in the same manner as the two terminal type thin film magnetic head as described in the embodiment.

Thus, in accordance with the present invention, the following effects can be obtained.

(a) Since a thin film magnetic head having a reading/writing element is formed in an end surface of a slider having an air bearing surface which surface is different from a side surface in which the bonding pads are formed, the surface area of the end surface having the reading/writing element can be reduced without suffering a restriction by a surface area in which the bonding pads are to be formed. Accordingly, a thin film magnetic head having reduced outer dimensions can be obtained.

(b) The side surface in which the bonding pad are formed is constituted by a cut surface obtained when thin film magnetic head elements are cut from a wafer. Accordingly, it is possible to expose the bonding pads at the side surface at the same time of cutting operations, and therefore, the manufacturing of the thin film magnetic head can be easy.

(c) Grooves formed in the side surface of the slider so as to extend through the bonding pads can certainly receive lead wires to be connected to a magnetic disk apparatus and can provide stable connection to the lead wires.

(d) Since an area to bond the lead wires is formed by chamfering the bonding pads, it is unnecessary to conduct a polishing operation for a protective layer which is required in the past. Accordingly, the manufacturing of the thin film magnetic head can be easy.

Obviously, numerous modifications and variations of the present invention are possible in light of the above teachings. It is therefore to be understood that within the scope of the appended claims, the invention may be practiced otherwise than as specifically described herein.

What is claimed is:

1. A thin film magnetic head comprising:
   a slider having an air bearing surface, an end surface, and first and second side surfaces;
   a reading/writing element formed in said end surface;
   a first bonding pad for the reading/writing element formed in said first side surface;
   a first groove formed in said first side surface so as to extend through said first bonding pad.

2. The thin film magnetic head according to claim 1, wherein the air bearing surface of the slider is flat.

3. The thin film magnetic head according to claim 1, further comprising:
   a second bonding pad formed in said first side surface.

4. The thin film magnetic head according to claim 1, further comprising:
   a second bonding pad formed in said second side surface.

5. The thin film magnetic head according to claim 1, further comprising:
   a second bonding pad formed in said first side surface; and
   a second groove formed in said first side surface extending through said second bonding pad.

6. The thin film magnetic head according to claim 1, further comprising:
   a second bonding pad formed in said second side surface; and
   a second groove formed in said second side surface extending through said second bonding pad.

* * * * *